United States Patent
Gianfranceschi

(10) Patent No.: US 9,810,298 B2
(45) Date of Patent: Nov. 7, 2017

(54) ROTARY SEALS

(71) Applicant: Microtecnica S.r.l, Turin (IT)

(72) Inventor: Marco Gianfranceschi, Turin (IT)

(73) Assignee: MICROTECNICA S.R.L., Turin (IT)

(*) Notice: Subject to any disclaimer, the term of this patent is extended or adjusted under 35 U.S.C. 154(b) by 0 days.

(21) Appl. No.: 15/148,145

(22) Filed: May 6, 2016

(65) Prior Publication Data
US 2016/0333996 A1    Nov. 17, 2016

(30) Foreign Application Priority Data

May 14, 2015   (EP) .................................... 15167765

(51) Int. Cl.
| | |
|---|---|
| *C23C 22/24* | (2006.01) |
| *F16J 15/34* | (2006.01) |
| *F16H 25/24* | (2006.01) |
| *C23C 4/18* | (2006.01) |
| *C23C 4/11* | (2016.01) |
| *C23C 4/134* | (2016.01) |
| *F16H 25/22* | (2006.01) |
| *F16J 15/18* | (2006.01) |

(52) U.S. Cl.
CPC ............ *F16H 25/2418* (2013.01); *C23C 4/11* (2016.01); *C23C 4/134* (2016.01); *C23C 4/18* (2013.01); *F16H 25/2204* (2013.01); *F16J 15/181* (2013.01); *F16H 2025/249* (2013.01)

(58) Field of Classification Search
CPC .... F16J 15/16; F16J 15/18; F16J 15/32; F16J 15/3204; F16J 15/3208; C23C 4/11; C23C 4/134; C23C 4/18

See application file for complete search history.

(56) References Cited

U.S. PATENT DOCUMENTS

| | | |
|---|---|---|
| 4,146,654 A | 3/1979 | Guyonnet |
| 5,165,699 A | 11/1992 | Shrontz |

(Continued)

FOREIGN PATENT DOCUMENTS

| | | |
|---|---|---|
| EP | 2039796 A1 | 3/2009 |
| JP | 11029876 A  * | 2/1999 |

OTHER PUBLICATIONS

Bal Seal Engineering: "Plasma spray coated shafts for rotary and reciprocating service in contact with Bal seals", Oct. 25, 2001 (Oct. 25, 2001), XP002747700, Retrieved from the Internet: URL:http://www.balseal.com/sites/default/files/tr3_020707125341.pdf [retrieved on Oct. 21, 2015], 7 pages.

(Continued)

*Primary Examiner* — Gilbert Lee
(74) *Attorney, Agent, or Firm* — Cantor Colburn LLP

(57) ABSTRACT

A rotary seal comprising: a shaft with a chromium oxide coating provided at a seal contact area; wherein said coating has a hardness of at least 55 Rockwell-C. The coating may have a surface roughness parameter (Ra) of between 0.2 and 0.4 circular. The coating may have a thickness of at least 0.1 mm. The coating layer forms part of a rotary seal with a flexible seal element that is biased into contact with the surface of the coating. The flexible seal element may be biased against the shaft by a spring to increase the pressure of the flexible seal element against the coating. The coating is preferably deposited by a plasma spray process.

8 Claims, 2 Drawing Sheets

(56) References Cited

U.S. PATENT DOCUMENTS

| | | | |
|---|---|---|---|
| 6,736,404 B1 * | 5/2004 | Shuster | F16C 3/03 |
| | | | 277/559 |
| 6,887,530 B2 * | 5/2005 | Fiala | B22F 3/115 |
| | | | 277/415 |
| 2003/0008764 A1 | 1/2003 | Wang | |
| 2006/0022411 A1 * | 2/2006 | Beardsley | F16J 15/344 |
| | | | 277/345 |
| 2013/0168928 A1 * | 7/2013 | Schrufer | C10M 103/02 |
| | | | 277/500 |
| 2014/0117627 A1 * | 5/2014 | Franke | F16J 15/16 |
| | | | 277/500 |
| 2014/0175756 A1 * | 6/2014 | Ikeda | F16J 15/164 |
| | | | 277/552 |
| 2014/0353925 A1 * | 12/2014 | Oshima | F16J 15/3244 |
| | | | 277/552 |
| 2015/0300497 A1 * | 10/2015 | Oshima | F16J 15/3204 |
| | | | 277/559 |
| 2016/0053895 A1 * | 2/2016 | Otschik | F16J 15/162 |
| | | | 277/405 |

OTHER PUBLICATIONS

European Search Report for application No. EP15167765.5; dated Mar. 2, 2016, 10 pages.

* cited by examiner

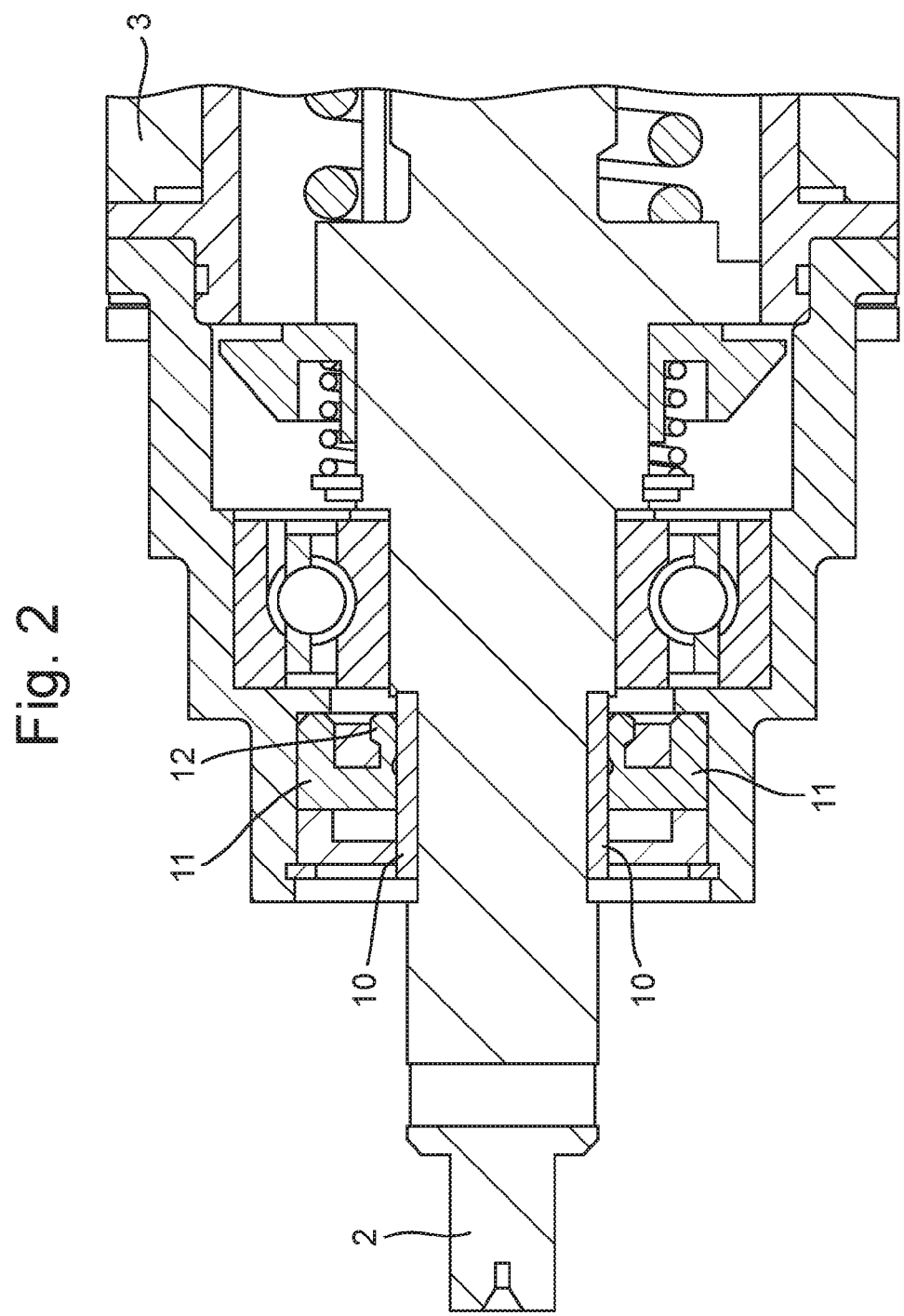

ROTARY SEALS

FOREIGN PRIORITY

This application claims priority to European Patent Application No. 15167765.5 filed May 14, 2015, the entire contents of which is incorporated herein by reference.

TECHNICAL FIELD

This disclosure relates to the use of wear-resistant coatings, to improve the performance/durability of dynamic seals for actuators such as aerospace actuator components.

BACKGROUND

Dynamic rotary seals are used in numerous engineering situations. One example in the aerospace industry is around actuator shafts where the shaft enters a gear box. The seal prevents water and other contaminants from entering into the gear box where these can cause wear and degradation of the gear box components and can lead to a decrease of efficiency and lubricant performances after a few years of service.

The durability requirements for aircraft components can be extremely demanding. For example, the mean time between failures (MTBF) for actuator shafts and seals can be very high, e.g. 250,000 flight hours. Such components are often expected to remain on the aircraft throughout the aircraft's entire life without replacement or major servicing (other than e.g. lubricant changes), thus a shaft/gear box seal might be expected to remain in service for 30 years in some cases.

As part of the seal arrangement, a flexible (e.g. elastomeric) seal component presses against the rotating shaft so as to create a barrier to ingress of contaminants. The materials from which such shafts are made (e.g. typically determined by required weight and/or torque characteristics) cannot provide sufficient wear resistance due to insufficient surface hardness. Over time, the contact and friction between the seal component and the shaft causes wear of the shaft. Too much wear of the shaft degrades the seal to the extent that contaminants can pass through the seal and the seal is considered to have failed.

The amount of wear experienced by the shaft depends on the force of the seal component against the shaft. Some seal designs result in more force than other seal designs and therefore result in more wear on the shaft.

SUMMARY

According to this disclosure there is provided a rotary seal comprising, a shaft with a chromium oxide coating provided at a seal contact area; wherein said coating has a hardness of at least 55 Rockwell-C(HRC).

The seal typically includes a flexible seal component that presses against the coating on the surface of the shaft so as to make the seal. The chromium oxide ($Cr_2O_3$) coating with hardness of at least 55 HRC provides increased wear resistance to the seal and thereby increases the service life of the seal. The seal can resist ingress of contaminants such as water and small particles, thus preventing dilution of lubricant and consequential wear. The coating hardness increases the mean time between failures and reduces (or possibly eliminates) the need for repair or replacement over a product lifetime.

In addition, the chromium oxide coating is corrosion resistant. This is an important quality for seals that will be exposed to harsh environments, e.g. exposed to water and/or high humidity, such as is the case for aerospace components like the drive systems and actuators of aircraft flaps and slats. It is important in these applications that the application of the coating does not degrade the corrosion resistant properties of the shaft.

As the coating and deposition process can be expensive, it is preferred that the coating is only provided in the seal contact area, thus forming a seal land as a ring around the shaft.

The coating preferably has a surface roughness parameter ($R_a$) higher than 0.1. A surface roughness lower than this can have a negative impact on seal behavior, for example there can be lubricant leakage and excessive wear of the seal when the surface is too smooth. In some examples, the surface roughness parameter ($R_a$) is at least 0.2.

The coating preferably has a surface roughness parameter ($R_a$) of no more than 0.4. If the coating is too rough, seal performance is also affected. For example the grooves caused by the grinding process can provide seal bypass channels and therefore the impact of these needs to be minimized.

Although linear grinding techniques may be used on the coating, the coating preferably has a surface that has been ground using a circular grinding technique. It has been found that the grooves of linear grinding have a greater detrimental impact on seal performance and therefore these should be avoided. It is most preferred that the coating has a surface that has been ground using a circular grinding technique. The grooves left by a circular grinding technique have lower impact on seal performance and therefore with the circular grinding technique the restriction on the surface roughness can be less demanding. For example it has been found that with a linear grinding process, the surface roughness of the chromium oxide coating must be no more than $R_a$ of 0.3, whereas with a circular grinding technique, the surface roughness ($R_a$) can be up to 0.4. Therefore the circular grinding technique allows more flexibility in the surface roughness parameter, specifically allowing a roughness ($R_a$) of between 0.3 and 0.4 to be usable.

Different materials require different deposition techniques and can result in unsatisfactory degradation of the corrosion resistant properties of the shaft. Different deposition techniques also have restrictions on the depth to which a coating can be deposited. Different deposition techniques will also affect the hardness of the deposited layer and thus may not be applicable. For example, typical plating techniques produce layers of the order of 0.02 mm. For long lifetime components which need to have a very long MTBF such as aerospace components, a seal coating thicknesses of 0.02 mm is insufficient and would be worn through quickly, causing seal failure. Preferably therefore the coating has a thickness of at least 0.1 mm. This thickness combined with the high hardness provides a seal land that remains wear-resistant and can maintain seal performance for a greatly extended period.

As mentioned above, the seal may comprise a flexible seal element that is biased into contact with the surface of the coating, i.e. biased against the outer surface of the coating around the shaft so as to form the seal. In some cases the inherent bias (e.g. resilience) of the material itself may provide sufficient force to maintain seal contact throughout the seal lifetime. However, in some preferred examples, the seal comprises a spring that is arranged to increase the pressure of the flexible seal element against the coating. The spring urges the seal material against the seal land (i.e. against the chromium oxide coating) so as to maintain sealing contact between the two components. While the spring has a beneficial effect in terms of maintaining the seal performance, the increased contact force increases the wear and thus impacts on the lifetime of the seal land. Therefore in such examples, there is an increased need for a highly wear resistant coating that can withstand the spring force over the expected lifetime of the seal.

As mentioned above, many different deposition techniques are available. However, in preferred examples, the coating is deposited by plasma spray. The coating thus deposited preferably has a hardness of at least 55 Rockwell-C(HRC). The plasma spray of chromium oxide results in the required hardness and advantageously can be used to deposit a coating of at least 0.1 mm thickness.

According to a further aspect, this disclosure provides an actuator assembly comprising: a gear box; an input shaft; and at least one rotary seal which seals the gear box around the input shaft, the rotary seal being as described above, optionally including any of the preferred features also described above.

In some preferred examples the gear box may be installed on top of a ball screw. Such arrangements are typical of aircraft actuator systems e.g. for operation and control of flaps and/or slats. The presence of a ball screw is beneficial in such systems for its low friction operation. However, that operation also requires highly efficient sealing as the ball screw is particularly susceptible to contaminants. Therefore the above-described sealing arrangements are particularly applicable to such actuator systems.

BRIEF DESCRIPTION OF DRAWINGS

One or more non-limiting examples will now be described, by way of example only, and with reference to the accompanying figures in which:

FIG. 2 shows a single rotary shaft seal in more detail.

DETAILED DESCRIPTION OF THE INVENTION

Figure 1:
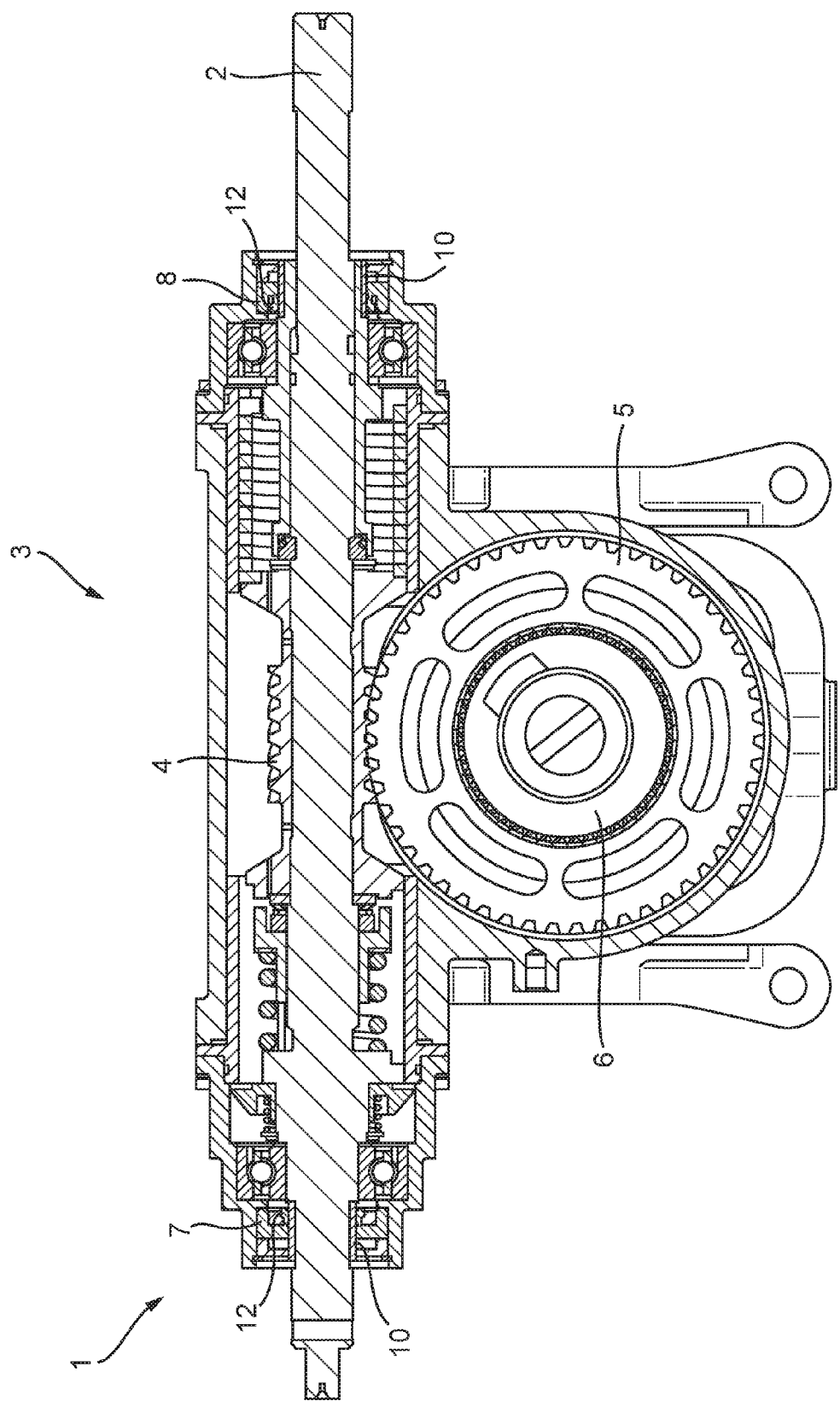
FIG. 1 shows an example of part of an aircraft actuator assembly.

The actuator assembly 1 of FIG. 1 includes a drive shaft 2 which acts as the input to a gear box 3. Inside the gear box 3, drive shaft 2 drives a worm gear 4 which turns a gear 5, causing rotation of ball screw 6, thereby causing linear movement to actuate (extend or retract) a flap or slat.

Shaft 2 extends through gear box 3 and can therefore provide torque to additional units downstream of gear box 3. To protect the interior of gear box 3, two seal assemblies 7, 8 are provided, one at each point of entry/exit of the shaft 2 (in the figure, one to the left and one to the right). The seals 7, 8 must provide sufficient sealing quality to prevent or minimize the ingress of contaminants from the outside of the gear box 3 to the inside thereof. The ingress of water is harmful to the gear box as it dilutes the lubricant leading to an increase in friction and a corresponding increase in wear of the components (e.g. worm gear 4 and gear 5) of the gear box 3 as well as potentially causing corrosion damage. Any particulate matter that enters the gear box past seals 7, 8 will also increase wear within the gear box 3, eroding the components, increasing clearances and friction and decreasing efficiencies. All of these effects reduce the life span of the gear box and eventually result in failure of the gear box and/or the need for replacement and/or serious maintenance and repair. In particular, the ball screw 6 is a high precision component that is particularly susceptible to wear. The seals 7, 8 are required to provide sealing both during intermittent periods of rotation (actuation of flaps/slats) and the intervening stationary intervals. Rotation of the shaft may be in either direction depending on the desired movement direction of the flap/slat.

The arrangement of seal 7 is shown in more detail in FIG. 2. The same principles apply to the seal 8. A layer 10 of chromium oxide ($Cr_2O_3$) has been formed on the exterior surface of shaft 2 by plasma spraying. The shaft 2 is formed from a steel material such as PH13. The plasma sprayed chromium oxide layer 10 has a Rockwell-C hardness of at least 55. The layer 10 is at least 0.1 mm thick in the radial direction (i.e. with respect to the radius of the shaft) and forms a band around the whole circumference of the shaft 2. The chromium oxide layer 10 has been finished with a circular grinding process that results in a surface roughness ($R_a$) of between 0.2 and 0.4 (this may be designated $R_a$=0.2-0.4 circular).

The layer 10 is not formed along the entire surface of the shaft 2, but is only formed in the vicinity of the sealing member 11 that in use presses against the layer 10 of shaft 2. The chromium oxide is relatively expensive and therefore it is desired not to apply the coating in areas other than where it is required for wear resistance, i.e. in the contact area of the seal so as to form a seal land. The plasma spray process to achieve the required properties is also an expensive process and, when it is to be used in aerospace applications, it is treated as a special process with subsequent checks to ensure that the process has performed to requirements.

The seal member 11 is typically made from a flexible material such as a rubber or other elastomeric material. The seal member 11 is biased by spring 12 so as to increase the force between the seal member 11 and the shaft 2 (more specifically the chromium oxide layer 10) so as to improve and maintain sealing quality.

The high hardness of the chromium oxide layer 10 with its particular surface roughness provides excellent sealing qualities as well as being highly resistant to wear even under the increased force applied by spring 12. The coating thickness ensures that these properties can be maintained for a long service life, i.e. with a long MTBF suitable for use in aircraft systems where safety and reliability are critical.

While it will be appreciated that the above description has been provided in relation to an actuator for flaps and slats on an aircraft, being a system in which the shaft typically rotates intermittently at around 1000 rpm with long periods of rest in between and rotation in either direction, the improved seal is also relevant to other applications such as drive shafts that may rotate at significantly higher speeds, for longer continuous operation and where rotation is largely unidirectional.

The invention claimed is:

1. A rotary seal comprising:
   a shaft with a chromium oxide coating provided at a seal contact area;
   wherein said coating has a hardness of at least 55 Rockwell-C;
   wherein the coating has a surface roughness parameter $R_a$ at least 0.2;
   wherein the coating has a thickness of at least 0.1 mm; and
   wherein the coating has a surface that has been ground using a non-linear grinding technique.

2. A rotary seal as claimed in claim 1, wherein the coating has a surface roughness parameter $R_a$ of no more than 0.4.

3. A rotary seal as claimed in claim 1, wherein the coating has a surface that has been ground using a circular grinding technique.

4. A rotary seal as claimed in claim 1, comprising a flexible seal element that is biased into contact with the surface of the coating.

5. A rotary seal as claimed in claim 4, wherein the seal comprises a spring arranged to increase the pressure of the flexible seal element against the coating.

6. A rotary seal as claimed in claim 1, wherein the coating has been deposited by plasma spray.

7. An actuator assembly comprising:
a gear box;
an input shaft; and
at least one rotary seal as claimed in claim 1 which seals the gear box around the input shaft.

8. An actuator assembly as claimed in claim 7, wherein the gear box comprises a ball screw.

* * * * *